(12) United States Patent
Plass

(10) Patent No.: US 7,417,795 B2
(45) Date of Patent: Aug. 26, 2008

(54) PROJECTOR SCREEN FOR IMAGE PROJECTION

(75) Inventor: Wilfried Plass, Bremen (DE)

(73) Assignee: Rheinmetall Defence Electronics GmbH, Bremen (DE)

( * ) Notice: Subject to any disclaimer, the term of this patent is extended or adjusted under 35 U.S.C. 154(b) by 183 days.

(21) Appl. No.: 10/498,569

(22) PCT Filed: Oct. 24, 2002

(86) PCT No.: PCT/EP02/11893

§ 371 (c)(1),
(2), (4) Date: May 16, 2005

(87) PCT Pub. No.: WO03/054624

PCT Pub. Date: Jul. 3, 2003

(65) Prior Publication Data

US 2005/0231801 A1    Oct. 20, 2005

(30) Foreign Application Priority Data

Dec. 12, 2001   (DE) ............................... 101 60 947

(51) Int. Cl.
*G03B 21/56* (2006.01)
*G03B 21/60* (2006.01)

(52) U.S. Cl. .................. 359/460; 359/452; 359/456

(58) Field of Classification Search .............. 359/443, 359/452, 455–457, 460
See application file for complete search history.

(56) References Cited

U.S. PATENT DOCUMENTS

| 5,699,131 | A | * | 12/1997 | Aoki et al. ................ 348/832 |
| 6,556,347 | B1 | * | 4/2003 | Murayama et al. .......... 359/453 |
| 6,788,460 | B2 | * | 9/2004 | Knox et al. ................ 359/456 |
| 2001/0021065 | A1 | | 9/2001 | Braun |
| 2002/0080484 | A1 | * | 6/2002 | Moshrefzadeh et al. ..... 359/460 |

FOREIGN PATENT DOCUMENTS

DE     201 11 288     10/2001

* cited by examiner

*Primary Examiner*—Diane I. Lee
*Assistant Examiner*—Magda Cruz
(74) *Attorney, Agent, or Firm*—Venable LLP; Michael A. Sartori; Ryan M. Flandro

(57) ABSTRACT

The invention relates to a projector screen for image projection, comprising a transparent support (16) which fixes the screen shape and a light-scattering layer, which covers at least one defined projection surface within the screen shape, whereby, in order to reduce the corona effect which degrades the image contrast and the image resolution, the light-scattering layer is embodied as a coating (18) on a very thin transparent film (17). Said film (17) is fixed to the separate support (16) and optically decoupled from the support (16), preferably by means of an air gap (19).

16 Claims, 1 Drawing Sheet

PROJECTOR SCREEN FOR IMAGE PROJECTION

Figure 1:
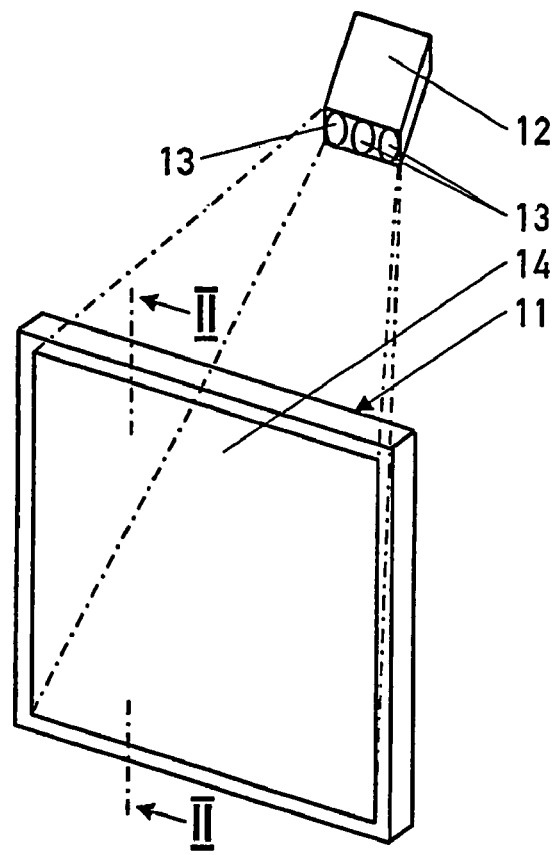

The invention relates to a projection screen for image projection.

For a previously proposed projection screen (DE 101 18 662.2-51), used in particular for the light-transmission projection with laser light, a light-scattering layer was deposited directly onto the plate-shaped carrier, wherein volume-scattering material was used for the deposited layer on the carrier to achieve a reduction in the so-called speckle.

However, it was found that the image contrast and the resolution are worse on a projection screen of this type—as is the case with other standard projections screens for the light-transmission projection—because of the so-called corona effect or aureole formation. This effect is triggered in that the light scattered by the light-scattering layer reaches the opposite side of the carrier and arrives there in part at an angle to the normal which is larger than the limit angle for the total reflection. The scattered light reflected on the opposite side travels back to the image-generating side and generates at the light/dark transitions and/or the color transitions an aureole, the so-called corona, which causes the worsening of the image resolution and the image contrast. The lateral expansion of this effect, meaning the width of the aureole, increases with the thickness of the layer on the carrier because the light propagation distance increases accordingly.

It is therefore the object of the present invention to improve a projection screen of the aforementioned type, so as to reduce the forming of a corona.

The projection screen according to the invention has the advantage that by optically decoupling the image-generating part of the projection screen from the static carrier part of the projection screen, the propagation and expansion distance for the scattered light which is responsible for the corona formation and which is reflected back to image plane can be designed to be extremely short without having any negative effect on the mechanical stability and rigidity of the projection screen. Owing to this short distance, which is determined only by the thickness and refractory index of the film, the lateral expansion of the reflected scattered light in the image plane is small, so that the width of the aureole forming around an image location is extremely reduced. As a result, the eye of the observer cannot detect the corona effect at all or can only detect a strongly reduced effect.

The additional claims describe useful embodiments of the projection screen according to the invention with advantageous modifications and designs of the invention.

According to one preferred embodiment of the invention, an air gap that extends over the complete surface of film and carrier is provided for the optical decoupling of the film from the transparent carrier which serves to secure the film.

According to a different preferred embodiment of the invention, a support structure is arranged between the inherently rigid carrier and the film with little rigidity for forming the air gap, wherein the film makes contact with this structure in at least some points. The support structure in this case is designed such that the ratio of the sum of its supporting surfaces to the sum of the exposed areas in-between is very small, e.g. amounts to less than 5%. To be sure, light is still conducted into the transparent carrier at the support locations, but the amount of the conducted light is so low, owing to the above-mentioned conditions, that an effective optical decoupling is achieved. Added to this is the fact that the remaining light conductance through the supporting locations occurs only at a strongly reduced angle spectrum. This results in a further reduction in the interfering corona effect since this effect is caused only by angles of incidence of the scattered light which are above the limit angle for the total reflection.

According to one advantageous embodiment of the invention, the film is attached along the edges to the transparent carrier, preferably by means of a transparent adhesive. Additional adhesive contact locations can be provided between the supporting structure and the film and/or the carrier to improve the adhesion between film and carrier. However, it is necessary to optimize the adhesive selection and the size and density of the support locations, so that the optical decoupling achieved with the air gap is not canceled out in part.

According to a preferred embodiment of the invention the support structure is realized by means of small, transparent balls, if possible arranged uniformly on the film and carrier surfaces that face each other, so that the film is supported on the carrier. The balls are advantageously secured in place with a transparent coat of lacquer applied to the film or to the carrier, wherein the thickness of the coat of lacquer is less than the ball diameter. Other support structures are possible as well, e.g. embossed films such as the ones offered by manufacturers in the packaging industry, or structures on the basis of a microstructure-generating lacquer.

The film for one advantageous embodiment of the invention can be deformed thermoplastically, thus making it possible to realize spherically curved projection screens. In that case, the use of a lacquer enriched with transparent balls in particular offers itself for the support structure, designed to support the coated film on the transparent carrier.

The invention is described in further detail in the following, using an exemplary embodiment shown in the drawing, wherein the following schematic Figures show:

FIG. 1 Cutouts of a projection system for the image projection by means of the light-transmission method.

Figure 2:
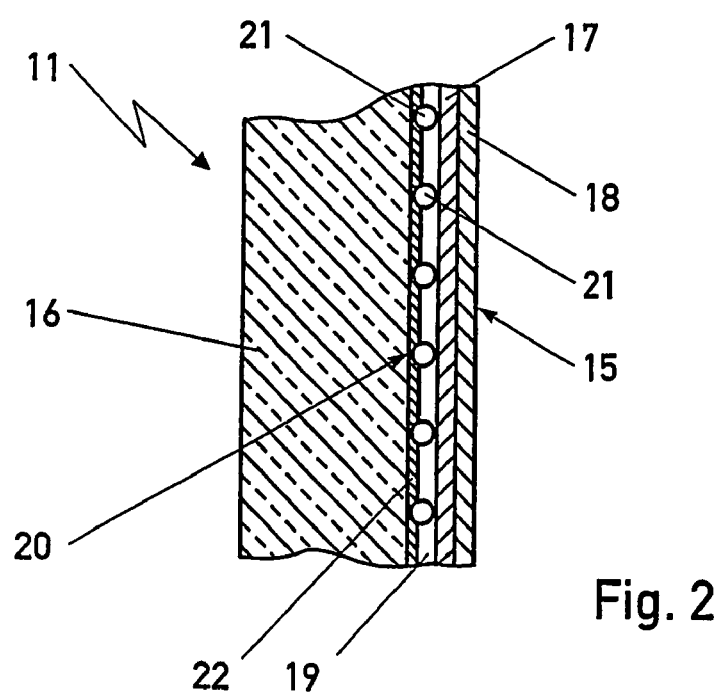

FIG. 2 Cutouts of an enlarged section through the projection screen for the projection system according to FIG. 1, along the line II-II.

The projection system, shown diagrammatically as perspective representation in FIG. 1, comprises a projection screen 11, as well as a projection device 12 that is assigned to the projection screen and has three projectors for the basic colors red, blue and green. These projectors are focused via separate lenses 13 or via a joint lens onto the projection screen 11 and illuminate a projection surface 14 thereon. For the exemplary embodiment, the image projection is a so-called light-transmission projection, meaning the projection screen 11 is disposed between an observer and the projection device 12.

FIG. 2 shows details of a sectional view of the projection screen 11 configuration. The projection screen comprises a transparent, disk-shaped or plate-shaped carrier 16 that fixes the screen geometry and determines the mechanical stability and rigidity of the projection screen 11. The projection screen furthermore comprises an image-generating part 15 that has little rigidity and which extends mostly across the projection surface 14 and is secured on the carrier 16. The image generating part 15 in this case can be arranged on the carrier 16 side that faces the projection device 12, as shown in FIG. 2, or on the carrier 16 side that faces away from the projection device 12.

The image-generating part 15 is an extremely thin, transparent film 17 coated with a layer 18 of light-scattering material. The film 17 is attached in such a way to the carrier 16 that it can be optically decoupled from the carrier 16, meaning it is attached to the carrier 16 in such a way that the optical feedback from the carrier 16 to the coating 18 is only slight or non-existent. The optical decoupling is achieved simply by means of an air gap 19 that extends over nearly the complete width across the opposite arranged surfaces of the carrier 16 and the film 17.

An optically transparent support structure 20 which makes contact at least in some points with the film 17 is arranged between the carrier 16 and the film 17 for creating the air gap 19. The support structure 20 is designed such that the ratio of the sum of its support surfaces to the sum of the remaining exposed surfaces in-between is rather small, e.g. amounts to less than 5%. The film 17 is attached along the edges to the carrier 16, preferably by using a transparent adhesive. The adhesive edge around the periphery in this case is preferably located outside of the projection surface 14. Alternative or additional adhesive contact locations can also be provided between the support locations of the support structure 20 and the film 17 and/or the carrier 16, thereby improving the adhesion of the film 17 on the carrier 16. However, it is important to ensure that the optical decoupling is not canceled out in the region between the individual support locations.

The support structure 20 for the embodiment shown in FIG. 2 is realized with the aid of small, transparent balls 21 which are distributed uniformly, if possible, across the opposite-arranged surfaces of film 17 and carrier 16 and which support the film 17 and the carrier 16. The balls are secured in place by a transparent coat of lacquer 22 that is applied to the carrier 16, wherein the thickness of the lacquer coat 22 is less than the ball 21 diameter. Alternatively, the coat of lacquer 22 can also be applied to the film 17.

A thermoplastically deformable film 17 which can be adapted true to form to the spherical curvature predetermined by the carrier 16 must be used for the image-generating part 15 if a spherically curved projection screen 11, as described, is to be set up in place of a planar projection screen 11 shown in FIG. 1, or in place of a cylindrically curved projection screen 11. With a spherically curved projection screen 11, the above-described configuration of the support structure 20 with transparent balls 21 and the transparent coat of lacquer 22 are particularly advantageous since this configuration can be adapted without problem to any form predetermined by the carrier 16.

The invention claimed is:

1. A projection screen for image projection, comprising:
   a transparent support that determines the screen geometry; and
   a light-scattering layer which covers at least one projection surface defined within the screen geometry, wherein the light-scattering layer comprises a coating on a thin, transparent film, wherein the film is attached to the support and is optically decoupled from the support, wherein an air gap exists between the support and the film for the optical decoupling, and wherein an optically transparent support-point structure is disposed between the support and the film for forming the air gap, wherein at least the film rests in points against the support-point structure.

2. The projection screen as defined in claim 1, wherein the support-point structure includes support surfaces and exposed surfaces in-between the support surfaces, wherein a ratio of a first area defined by the support surfaces to a second area defined by exposed surfaces is less than 0.05.

3. The projection screen as defined in claim 2, wherein the support surfaces of the support-point structure are fixedly connected to the film and to the support.

4. The projection screen as defined in claim 1, wherein the film and the support are fixedly joined along an edge.

5. The projection screen as defined in claim 4, wherein a transparent adhesive fixedly connects the support surfaces of the support-point structure to the film and to the support.

6. The projection screen as defined in claim 1, wherein the support-point structure comprises small, transparent balls which are arranged so as to be distributed substantially uniformly across opposite-arranged surfaces of the film and the support to support the film on the support.

7. The projection screen as defined in claim 6, wherein the balls are secured on a coat of lacquer deposited on the support or on the film, and wherein the thickness of the coat of lacquer is less than a diameter of the balls.

8. The projection screen as defined in claim 1, wherein the film is thermoplastically deformable.

9. A projection screen, comprising:
   a substantially rigid transparent carrier; and
   an image-generating part comprising:
      a thin, transparent film; and
      a coating on the film, wherein the coating comprises a light-scattering material, and wherein the image-generating part is attached to the carrier and is optically decoupled from the carrier, wherein an air gap exists between the carrier and the image-generating part; and
   an optically transparent support-point structure disposed between the carrier and the image-generating part for forming the air gap, wherein at least the film contacts the support-point structure.

10. The projection screen of claim 9, wherein the support-point structure includes support surfaces contacting the film and defines exposed surfaces on the film in-between the support surfaces, wherein a ratio of a first area defined by the support surfaces to a second area defined by exposed surfaces is less than 0.05.

11. The projection screen of claim 10, wherein the support surfaces of the support-point structure are fixedly connected to the film and to the carrier.

12. The projection screen of claim 9, wherein the film and the carrier are fixedly joined along an edge.

13. The projection screen of claim 12, further comprising a transparent adhesive fixedly connecting the support surfaces of the support-point structure to the film and to the carrier.

14. The projection screen as defined in claim 9, wherein the support-point structure comprises small, transparent balls distributed substantially uniformly across opposing surfaces of the film and the carrier to support the film on the carrier.

15. The projection screen as defined in claim 14, wherein the balls are secured on a coat of lacquer deposited on the carrier or on the film, and wherein the thickness of the coat of lacquer is less than a diameter of the balls.

16. The projection screen as defined in claim 9, wherein the film is thermoplastically deformable.

* * * * *